Patented Nov. 1, 1932

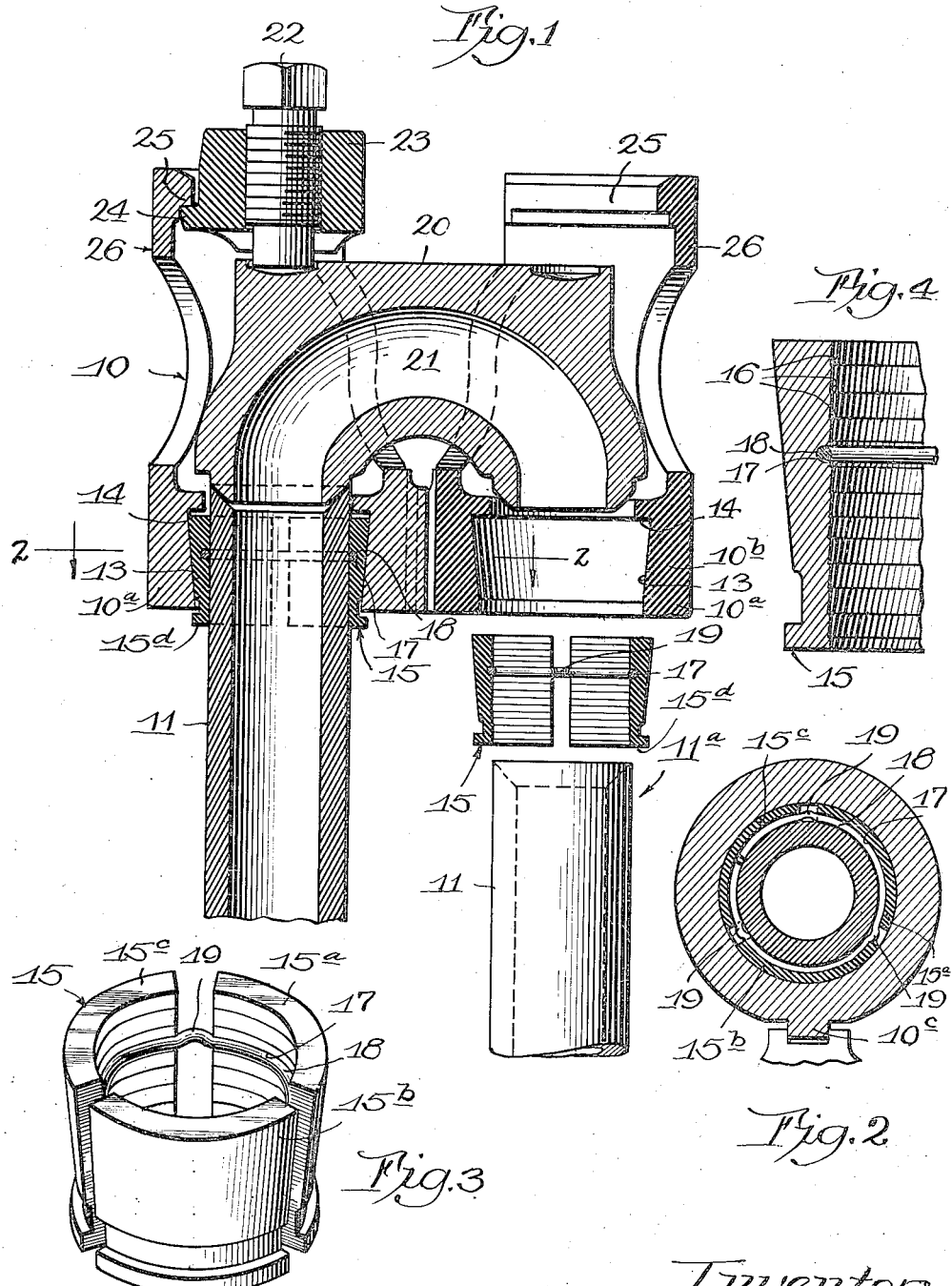

1,885,779

UNITED STATES PATENT OFFICE

CARLYLE V. STEWART, OF SPRINGFIELD, OHIO, ASSIGNOR TO THE OHIO STEEL FOUNDRY COMPANY, OF LIMA, OHIO, A CORPORATION OF OHIO

TUBE CONNECTION FOR OIL REFINERY FITTINGS

Application filed November 10, 1930. Serial No. 494,554.

This invention relates to improvements in tube couplings, and more particularly to coupling means for return bend fixtures used in oil refinery stills, although not necessarily limited to such use.

The principal object of the invention is to provide an improved and simplified means for securing and locking the ends of the tubes in return bend fittings and the like.

The invention may best be understood by reference to the accompanying drawing, in which Figure 1 is a view in vertical cross section of a return bend constructed in accordance with my invention, and showing one tube in coupled position and another tube in disassembled position.

Figure 2 is a detail section taken on line 2—2 of Figure 1.

Figure 3 is a perspective view of the clamping or locking ring.

Figure 4 is an enlarged detail section of the clamping ring.

Referring to details of the drawing, 10 indicates the body of a 180° pipe bend fitting of the type utilized in tube stills and the like, which is adapted to have a pair of tubes 11 and 11a, attached thereto in parallel relation. In the form shown, the body is made up of two separate end pieces 10a, 10b having a tongue and groove connection at adjacent sides, as indicated at 10c.

Each of the tubes is connected to the fitting in a similar manner so that a description of one will suffice for the understanding of both.

The tube 11 fits in an aperture 13 which is recessed at 14 with its side walls tapering toward the extended portion of the tube. A split clamping ring 15 having a similarly tapered outer surface is fitted within this recess, said ring being split longitudinally into a plurality of segments, as for instance three segments, 15a, 15b, 15c, as is best indicated in Figure 2. The engaging portions of the tube and split ring are provided with suitable friction means, herein consisting of a plurality of circularly cut gripping teeth 16, 16 formed on the inside of the segments, as is shown in Figure 4. It will be understood, however, that any other suitable means may be provided for insuring frictional engagement between the split ring 15 and the end of the tube which it surrounds.

Means are provided for maintaining the segments in properly spaced relation relative to each other, said means herein comprising a spring wire retaining ring 17 which is engaged in a suitable circular groove 18 in said split ring, in the form shown said groove being formed on the inner face of said split ring. The retaining ring 17 is preferably provided with a plurality of offset loops or bends 19, 19 which project between adjacent segments of the split ring so as to yieldingly space them apart.

A suitable end fitting is provided to engage the end of the tube 11 and provide communication with the companion tube 11a parallel therewith. In the form shown this end fitting consists of a single casting 20 having a semi-circular passage 21 therein. Said casting is secured in place by means of a pair of detachable locking devices, each mounted in axial alignment with the ends of the tubes 11, 11a.

As shown herein, each of said locking devices comprises a set screw 22 having threaded engagement with a removable locking piece 23 having lateral projecting lugs 24, 24 arranged to engage beneath projecting locking flanges 25, 25 carried on upstanding members 26, 26 at the opposite sides of the end fitting 20. The arrangement is such that when the set screw is sufficiently withdrawn, the locking piece may be fitted between the upstanding members 26, 26 and moved laterally so that the lugs 24, 24 pass between the flanges 25, 25. The set screw may then be screwed down upon the head of the end casting 20 to hold it tightly in place with the opposite ends of the semi-circular passage 21 registering with the ends of tubes 11 and 11a.

It will be observed that when pressure is applied upon the casting 20 by means of the set screw, said casting is engaged directly with the end of the adjacent tube 11, and has a tendency to force the tube longitudinally of the aperture 13 in which said tube is seated. The split ring 15 is initially inserted loosely in the recess 14, but when the set screw is tightened down as described, the gripping teeth 16, 16 in the split ring are engaged by the sides of the tube and are moved downwardly therewith, with the result that the tapered ring is clamped inwardly against the tube and locks said tube securely in place relative to the end fitting.

The tube may be loosened and removed by first loosening the set screw 22 to relieve pressure on the end of the tube, and then forcing the exposed end of the tapered ring inwardly by means of a suitable tool, which may be engaged with a shoulder 15$d$ formed on the exposed end of said ring for this purpose.

A pipe bend constructed as above described has the advantage of affording a positive and quick acting locking means for the tubes relative to the end fittings, together with means for easily removing the tubes when required for cleaning, repair or replacement.

While I have shown and described one particular embodiment and application of my invention, it will be understood that I do not wish to be limited to the construction or use therefor shown and described, but that various changes and modifications may be made without departing from the spirit and scope of my invention.

I claim as my invention:

In a device of the character described, and in combination with a tube of substantially uniform diameter, a casing having a tapered aperture for said tube, a split ring fitting in said tapered aperture and having a serrated inner surface engaging the outer surface of said tube, a communicating fixture non-rotatably mounted on said casing, clamping means acting to force said fixture endwise against the end of said tube in a direction to contract said split ring in said tapered aperture and lock said tube therein said split ring having an extension at its smaller end projecting beyond said casing to permit unlocking said tube by reverse movement of said ring.

Signed at Springfield Ohio this 7th day of November, 1930.

CARLYLE V. STEWART.